(12) United States Patent
Etchegoyen

(10) Patent No.: US 8,239,852 B2
(45) Date of Patent: Aug. 7, 2012

(54) REMOTE UPDATE OF COMPUTERS BASED ON PHYSICAL DEVICE RECOGNITION

(75) Inventor: Craig Stephen Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 0 days.

(21) Appl. No.: 12/818,906

(22) Filed: Jun. 18, 2010

(65) Prior Publication Data

US 2010/0333081 A1 Dec. 30, 2010

Related U.S. Application Data

(60) Provisional application No. 61/220,092, filed on Jun. 24, 2009.

(51) Int. Cl.
*G06F 9/44* (2006.01)
(52) U.S. Cl. .................... 717/172; 717/168; 717/171
(58) Field of Classification Search ........... 717/168–178
See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,155,847 A * | 10/1992 | Kirouac et al. | 709/221 |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |

(Continued)

FOREIGN PATENT DOCUMENTS

AU 678985 6/1997

(Continued)

OTHER PUBLICATIONS

Williams, R., "A Painless Guide to CRC Error Detection Algorithms", Ver. 3, Aug. 19, 1993.

(Continued)

*Primary Examiner* — Wei Zhen
*Assistant Examiner* — Qing Chen
(74) *Attorney, Agent, or Firm* — Sean D. Burdick

(57) ABSTRACT

A system for remotely updating a program configuration includes an update server in communication with a client device configured to execute a remote update program. The client device includes a first processor coupled to memory storing the program which, executed, performs physical device recognition on the client device to determine its machine parameters, and generates unique device identifiers based thereon, and a first transceiver configured to send the identifiers to the update server. The update server is configured to collect the identifiers from the client device, and includes a second processor for analyzing the identifiers and determining an updated program configuration based on the collected identifiers matching known identifiers, and a second transceiver configured to deliver data representing the updated program configuration to the client device for storage therein.

18 Claims, 6 Drawing Sheets

U.S. PATENT DOCUMENTS

| | | | | |
|---|---|---|---|---|
| 6,009,401 | A | 12/1999 | Horstmann | |
| 6,044,471 | A | 3/2000 | Colvin | |
| 6,158,005 | A | 12/2000 | Bharathan et al. | |
| 6,230,199 | B1 | 5/2001 | Revashetti et al. | |
| 6,233,567 | B1 | 5/2001 | Cohen | |
| 6,243,468 | B1 | 6/2001 | Pearce et al. | |
| 6,294,793 | B1 | 9/2001 | Brunfeld et al. | |
| 6,324,519 | B1 | 11/2001 | Eldering | |
| 6,327,617 | B1* | 12/2001 | Fawcett | 709/219 |
| 6,330,670 | B1 | 12/2001 | England et al. | |
| 6,449,645 | B1 | 9/2002 | Nash | |
| 6,467,088 | B1* | 10/2002 | alSafadi et al. | 717/173 |
| 6,536,005 | B1 | 3/2003 | Augarten | |
| 6,785,825 | B2 | 8/2004 | Colvin | |
| 6,859,793 | B1 | 2/2005 | Lambiase | |
| 6,880,086 | B2* | 4/2005 | Kidder et al. | 713/191 |
| 6,920,567 | B1 | 7/2005 | Doherty et al. | |
| 6,976,009 | B2 | 12/2005 | Tadayon et al. | |
| 7,032,110 | B1 | 4/2006 | Su et al. | |
| 7,069,440 | B2 | 6/2006 | Aull | |
| 7,069,595 | B2 | 6/2006 | Cognigni et al. | |
| 7,085,741 | B2 | 8/2006 | Lao et al. | |
| 7,188,241 | B2 | 3/2007 | Cronce et al. | |
| 7,200,237 | B2* | 4/2007 | Zhang et al. | 381/60 |
| 7,203,966 | B2 | 4/2007 | Abburi et al. | |
| 7,206,765 | B2 | 4/2007 | Gilliam et al. | |
| 7,272,728 | B2 | 9/2007 | Pierson et al. | |
| 7,319,987 | B1 | 1/2008 | Hoffman et al. | |
| 7,327,280 | B2 | 2/2008 | Bachelder et al. | |
| 7,337,147 | B2 | 2/2008 | Chen et al. | |
| 7,343,297 | B2 | 3/2008 | Bergler et al. | |
| 7,463,945 | B2 | 12/2008 | Kiesel et al. | |
| 7,577,948 | B2* | 8/2009 | Zomaya et al. | 717/168 |
| 7,653,899 | B1 | 1/2010 | Lindahi et al. | |
| 7,676,804 | B2* | 3/2010 | Ferguson et al. | 717/173 |
| 2001/0034712 | A1 | 10/2001 | Colvin | |
| 2001/0044782 | A1 | 11/2001 | Hughes et al. | |
| 2002/0019814 | A1 | 2/2002 | Ganesan | |
| 2002/0082997 | A1 | 6/2002 | Kobata et al. | |
| 2002/0099952 | A1* | 7/2002 | Lambert et al. | 713/200 |
| 2002/0161718 | A1 | 10/2002 | Coley et al. | |
| 2003/0014745 | A1* | 1/2003 | Mah et al. | 717/170 |
| 2003/0065918 | A1 | 4/2003 | Willey | |
| 2003/0172035 | A1 | 9/2003 | Cronce et al. | |
| 2003/0195995 | A1* | 10/2003 | Tabbara | 709/313 |
| 2004/0024860 | A1 | 2/2004 | Sato et al. | |
| 2004/0030912 | A1 | 2/2004 | Merkle et al. | |
| 2004/0059929 | A1 | 3/2004 | Rodgers et al. | |
| 2004/0143746 | A1 | 7/2004 | Ligeti et al. | |
| 2004/0187018 | A1 | 9/2004 | Owen et al. | |
| 2005/0034115 | A1* | 2/2005 | Carter et al. | 717/173 |
| 2005/0055269 | A1 | 3/2005 | Roetter et al. | |
| 2005/0108173 | A1 | 5/2005 | Stefik et al. | |
| 2005/0138155 | A1 | 6/2005 | Lewis | |
| 2005/0172280 | A1 | 8/2005 | Ziegler et al. | |
| 2005/0262498 | A1* | 11/2005 | Ferguson et al. | 717/172 |
| 2006/0072444 | A1 | 4/2006 | Engel et al. | |
| 2006/0095454 | A1 | 5/2006 | Shankar et al. | |
| 2006/0161914 | A1 | 7/2006 | Morrison et al. | |
| 2006/0265337 | A1 | 11/2006 | Wesinger, Jr. | |
| 2006/0282511 | A1 | 12/2006 | Takano et al. | |
| 2007/0072676 | A1 | 3/2007 | Baluja | |
| 2007/0168288 | A1 | 7/2007 | Bozeman | |
| 2007/0169087 | A1* | 7/2007 | Fadell | 717/168 |
| 2007/0198422 | A1 | 8/2007 | Prahlad et al. | |
| 2007/0203846 | A1 | 8/2007 | Kavuri et al. | |
| 2007/0219917 | A1 | 9/2007 | Liu et al. | |
| 2007/0282615 | A1 | 12/2007 | Hamilton et al. | |
| 2008/0065552 | A1 | 3/2008 | Elazar et al. | |
| 2008/0086423 | A1 | 4/2008 | Waites | |
| 2008/0147556 | A1 | 6/2008 | Smith et al. | |
| 2008/0167943 | A1 | 7/2008 | O'Neil et al. | |
| 2008/0228578 | A1 | 9/2008 | Mashinsky | |
| 2008/0320607 | A1 | 12/2008 | Richardson | |
| 2009/0037337 | A1* | 2/2009 | Baitalmal et al. | 705/59 |
| 2009/0083730 | A1 | 3/2009 | Richardson | |
| 2009/0138975 | A1 | 5/2009 | Richardson | |

FOREIGN PATENT DOCUMENTS

| | | |
|---|---|---|
| EP | 1 096 406 | 5/2001 |
| EP | 1637958 | 3/2006 |
| EP | 1637961 | 3/2006 |
| EP | 1670188 | 6/2006 |
| WO | WO 9220022 | 11/1992 |
| WO | WO 9301550 | 1/1993 |
| WO | WO 9535533 | 12/1995 |
| WO | WO 0067095 | 11/2000 |
| WO | WO 01/90892 | 11/2001 |
| WO | WO 2005104686 | 11/2005 |
| WO | WO2007060516 | 5/2007 |
| WO | WO2008013504 | 1/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |

OTHER PUBLICATIONS

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Microsoft Corporation, "Operations Guide: Microsoft Systems Management Server 2003," 2003, Internet Citation retrieved on Jun. 27, 2007. XP 002439673.

Rivest, R. "RFC 1321—The MD5 Message Digest Algorithm," Apr. 1992, Retrieved from the Internet on Jul. 21, 2005.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

* cited by examiner

REMOTE UPDATE OF COMPUTERS BASED ON PHYSICAL DEVICE RECOGNITION

This application claims priority to U.S. Provisional Application No. 61/220,092 which was filed Jun. 24, 2009 and which is fully incorporated herein by reference.

BACKGROUND

1. Field of the Invention

The present invention relates to computers and, in particular, to methods, apparatus and systems for maintaining appropriate configuration updates to software/hardware configuration through the use of physical device recognition to tailor configuration updates.

2. Description of the Related Art

Monitoring changes and updates to the plurality of computer programs resident on a client device is a difficult task for the typical user to consistently perform. In addition, the latest update from a vendor may not be appropriate considering the hardware, software or physical/geo-location of the client device. Thus, there is a need in the art for a tool that will automate the program configuration update process and optimize the suggested updated program configuration to match the environment of the client device.

The present invention is directed toward a system, method and apparatus for remote updating of the configuration of a computer. One embodiment of the invention is system for remote updating a computer configuration, comprising: a client device configured to load a computer program to perform a remote update; a processor, at the client device, configured to perform physical device recognition on the client device to determine machine parameters, wherein unique device identifiers are generated for the client device, at least in part, based on the determined machine parameters; a transceiver configured to send the unique device identifiers to at least one of an auditing server and an update server via Internet; an update server configured to collect the unique device identifiers from at least one client device; a processor, at the update server, configured to analyzed the unique identifiers at the update server, wherein the analyzed unique identifiers determine an updated program configuration; and a transceiver, at the update server, configured to deliver the updated program configuration to the client device via Internet.

In accordance with one aspect of the embodiments described herein, there is provided an apparatus for remote update of a program, comprising: means for loading a client device with a computer program configured to perform a remote update; means for performing physical device recognition on the client device to determine machine parameters; means for generating unique device identifier based at least in part on the determined machine parameters; means for sending the unique device identifier to at least one of an auditing server and an update server; and means for receiving an updated program configuration from the update server.

In accordance with another aspect of the embodiments described herein, there is provided a method for remote update of a program, comprising: collecting unique identifiers from at least one of an audit server and client device at an update server; analyzing the unique identifiers; determining an updated program configuration for the client device from the analyzed unique identifiers; and delivering the updated program configuration to the client.

In accordance with another aspect of the embodiments described herein, there is provided a tangible computer readable medium having stored thereon, computer-executable instructions that, if executed by a computing device, cause the computing device to perform a method comprising: loading a client device with a computer program configured to perform a remote update; performing physical device recognition on the client device to determine machine parameters; generating unique device identifier based at least in part on the determined machine parameters; sending the unique device identifier to at least one of an auditing server and an update server; and receiving an updated program configuration from the update server.

In accordance with another aspect of the embodiments described herein, there is provided an apparatus for remote updating of a program, comprising: means for collecting unique identifiers from at least one of an audit server and client device; means for analyzing the unique identifiers; means for determining an updated program configuration for the client device from the analyzed unique identifiers; and means for delivering the updated program configuration to the client.

In accordance with another aspect of the embodiments described herein, there is provided a tangible computer readable medium having stored thereon, computer-executable instructions that, if executed by a computing device, cause the computing device to perform a method comprising: collecting unique identifiers from at least one of an audit server and client device; analyzing the unique identifiers; determining an updated program configuration for the client device from the analyzed unique identifiers; and delivering the updated program configuration to the client.

DETAILED DESCRIPTION

Figure 1:
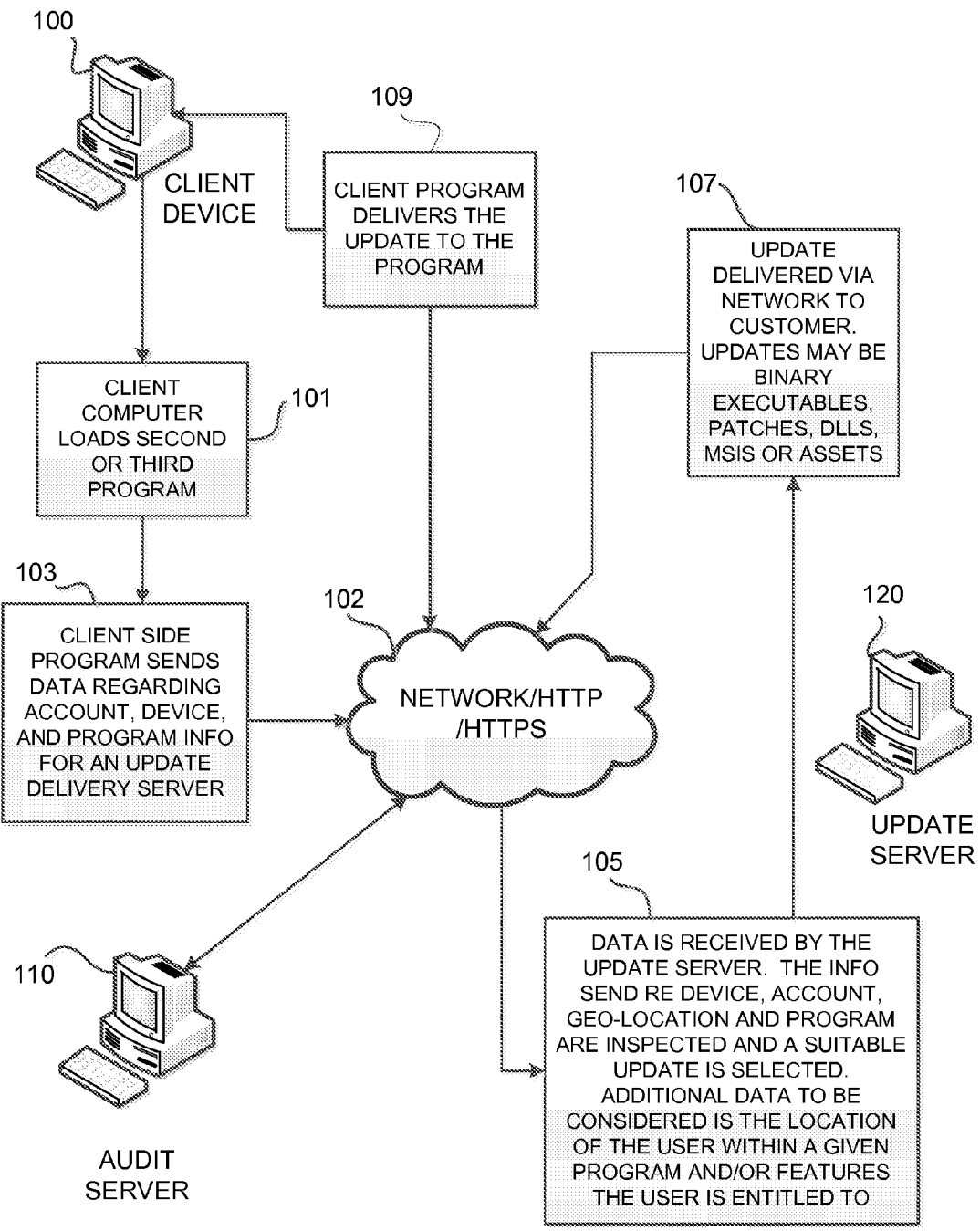
FIG. 1 is a schematic diagram of a system for remote updating of a client device by an update server in accordance with an embodiment of the invention.

In accordance with the present technology, there is provided a system, method and apparatus for the remote update of computer software licenses through the use of physical device recognition. In particular, FIG. 1 shows an exemplary schematic diagram for a system for remote updating of at least one client device 100 by an update server 120 in accordance with an exemplary embodiment of the invention. In particular, FIG. 1, shows an exemplary system having at least one computing/network client device 100 that is in operative communication via the Internet 102 with an audit server 110 and an update server 120. While only one client device 100 is illustrated in FIG. 1, it will be understood that a given system may comprise any number of client devices and use any number of apparatuses and methods of the invention as described herein. Further details regarding the system of FIG. 1 are provided below.

Figure 2:
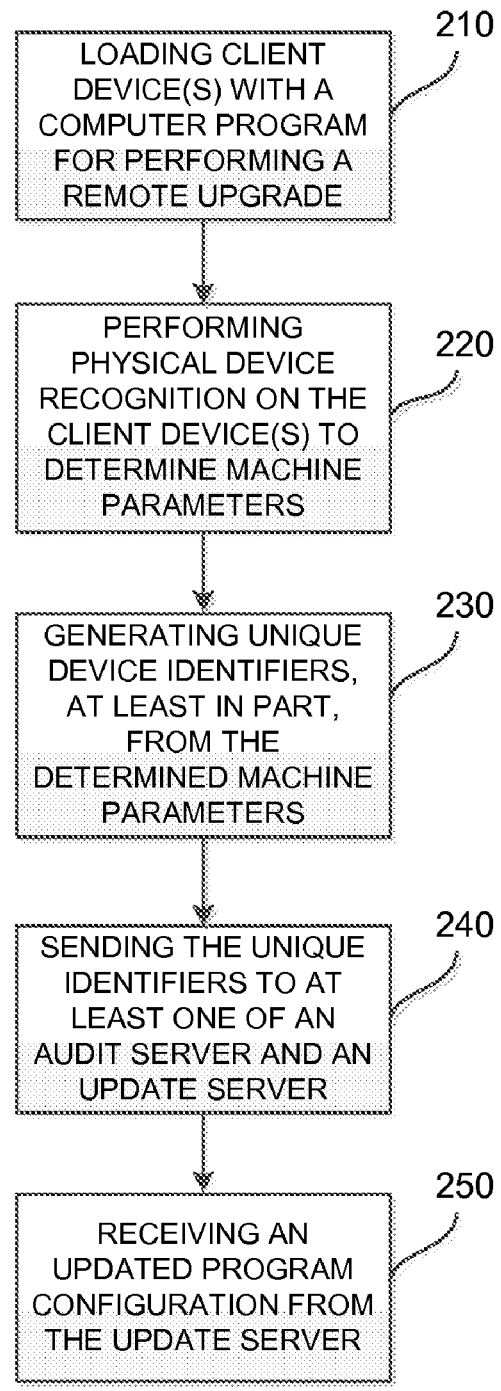
FIG. 2 is a flow diagram of a method for remote updating of a client device in accordance with an embodiment of the invention implemented on the client device.

FIG. 2 provides an exemplary flow diagram of a method for remotely updating a client device. In particular, in step 210 of FIG. 2, the loading of at least one client device with a computer program for remote updating is performed. Physical device recognition of at least one of a software, hardware and geo-location environment of the client device is performed to determine machine parameters in step 220. Step 230 involves generating unique device identifiers, at least in part, from the determined machine parameters. The unique device identifiers are sent to at least one of an audit server 110 and an update server 120, as shown in FIG. 1, in step 240. In step 250, the client device 100 receives an updated program configuration from the update server 120, as shown in FIG. 1.

Figure 3:
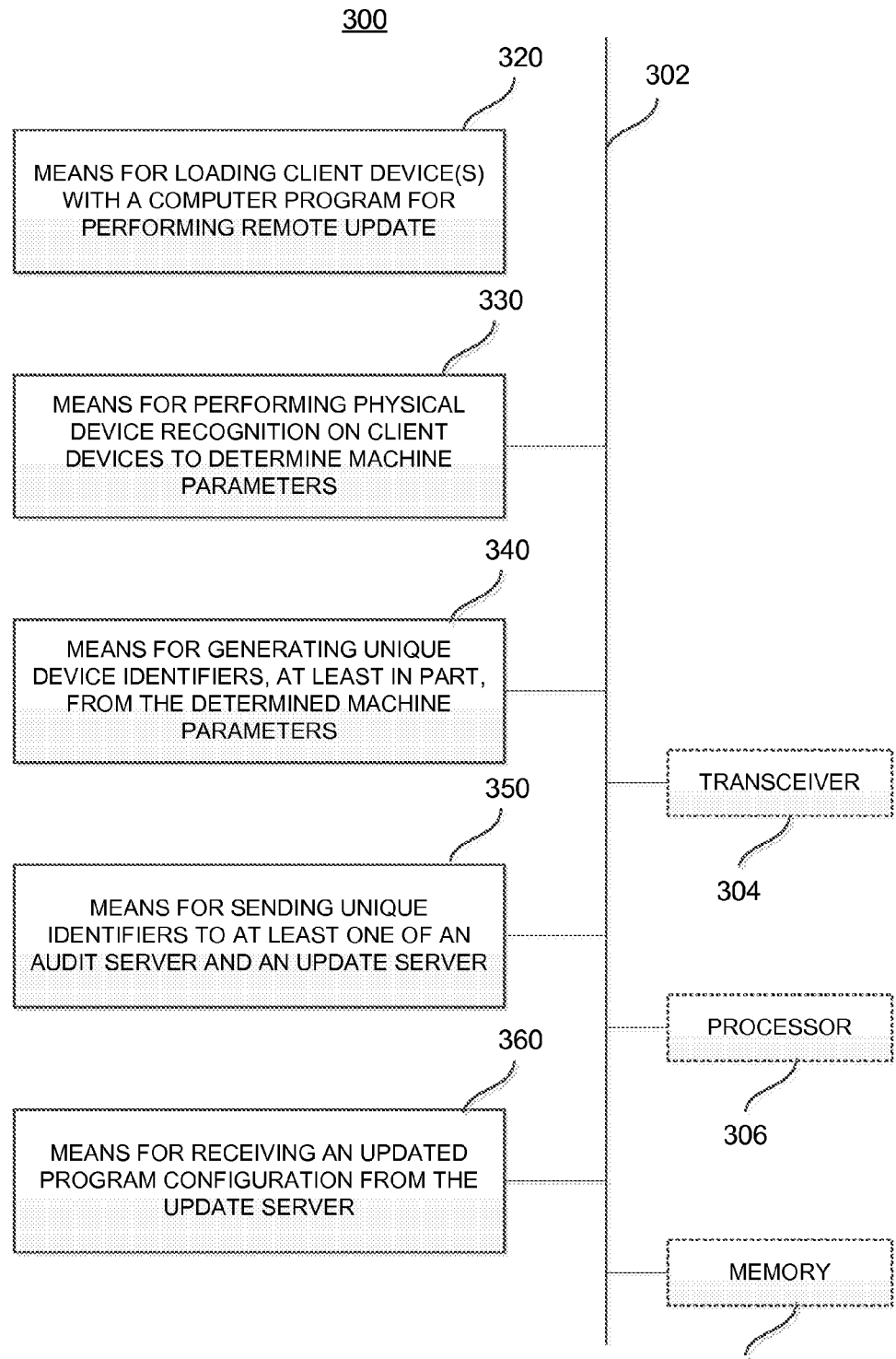
FIG. 3 is a block diagram of an apparatus according to the invention that may be configured as a client device, or as a processor or similar device for use within a client device.

FIG. 3 illustrates an exemplary apparatus that may be configured as a client device, comprising: a transceiver 304, a processor 306 and a memory 308; or as a processor 306; or as a similar device for use within a client device 100, as shown in FIG. 1, which provides the means for implementing the method, as disclosed in FIG. 2, on the client device 100. In particular, apparatus 300 may comprise means for loading 320 a client device with a computer program for performing a remote update. In addition, the apparatus 300 may comprise means for performing 320 physical device recognition of one or more machine parameters of the client device. The machine parameters may comprise a combination of at least one user-configurable parameter and at least one non-user-configurable parameter of the client device. Further, the apparatus 300 may comprise a means for generating 340 a device identifier for the device based at least in part on the collected one or more machine parameters. Furthermore, apparatus 300 may comprise means for sending unique identifiers to at least one of an audit server and an update server. Moreover, apparatus 300 may comprise means for receiving 360 an updated program configuration from the update server.

In addition, apparatus 300 may further comprise a means for determining the geo-location code for the device and for associating the geo-location code with a unique device identifier; and a software identifier to generate an audit number. The geo-location code may comprise, but is not limited to an Internet protocol (IP) address.

The apparatus 300 may further comprise a means for generating a device identifier by implementing or executing at least one irreversible transformation such that the machine parameters cannot be derived from the device identifier. Additionally, at least one of the irreversible transformations may comprise, but is not limited to a cryptographic hash function.

It is noted that apparatus 300 may optionally include a processor module 306 having at least one processor, in the case of apparatus 300 configured as computing device, rather than as a processor. Processor module 306, in such case, may be in operative communication with means for determining the geo-location code; means for generating a device identifier by implementing or executing at least one irreversible transformation and components thereof, via a bus 302 or similar communication coupling. Processor 306 may effect initiation and scheduling of the processes or functions performed by means for generating a device identifier by implementing or executing at least one irreversible transformation, and components thereof.

In related aspects, apparatus 300 may include a transceiver module 304 for communicating with means for generating a device identifier by implementing or executing at least one irreversible transformation, and components thereof. A stand alone receiver and/or stand alone transmitter may be used in lieu of or in conjunction with the transceiver 304.

In addition, apparatus 300 may optionally include a means for storing information, such as, for example, a computer readable medium or memory device/module 308. Further, the memory device/module 308 may be operatively coupled to the other components of apparatus 300 via bus 302 or the like. The computer readable medium or memory device 308 may be adapted to store computer readable instructions and data for effecting the methods of FIG. 2; and, as shown in FIG. 3, the processes and behavior of means 320-360; means for determining the geo-location code; means for generating a device identifier by implementing or executing at least one irreversible, and components thereof; or processor 306 (in the case of apparatus 300 being configured as a computing device) or the methods disclosed herein.

In yet further related aspects, the memory module 308 may optionally include executable code for the processor module 304 configured to: (a) determine machine parameters of a client device, the machine parameters comprising a combination of at least one user-configurable parameter and at least one non-user-configurable parameter of the device; (b) generate a device identifier for the device based, at least in part, on the machine parameters; and (c) determine whether an Internet connection is available for the client device. One or more of steps (a)-(c) may be performed by a processor module in lieu of or in conjunction with the means described above.

Figure 4:
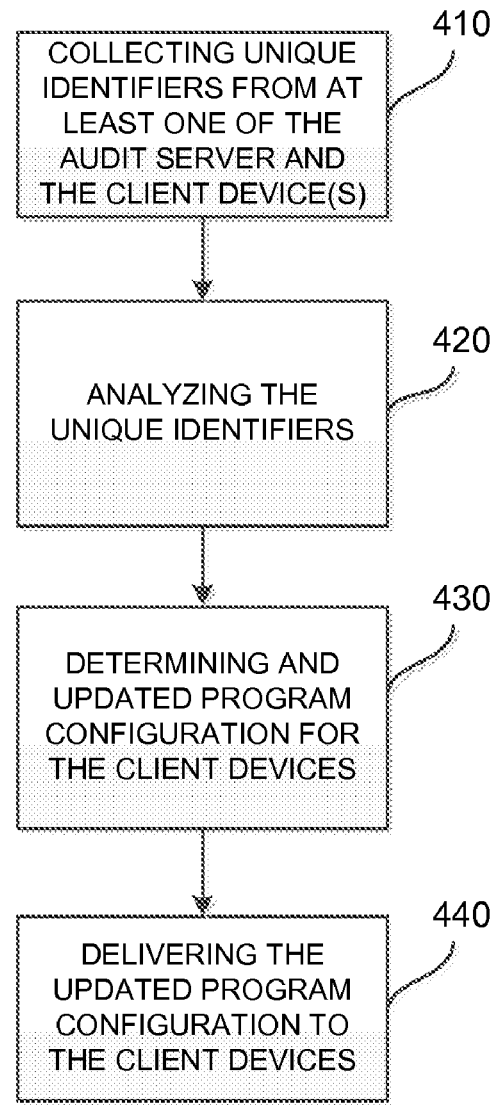
FIG. 4 is a flow diagram of a method for remote updating of a client device in accordance with an embodiment of the invention implemented on the update server.

FIG. 4 shows an exemplary flow diagram of a method for remote updating of a client device in accordance with an embodiment of the invention on the update server 120, as shown in FIG. 1. In particular, in step 410 the unique identifiers are collected by update server 120 from at least one of the audit server 110 and the client device 100, as shown FIG. 1. The unique identifiers are then analyzed on the update server in step 420. Step 430 involves determining an updated program configuration for the client device from the analysis of the unique identifiers. The updated program configuration is delivered to the client device in step 440.

Figure 5:
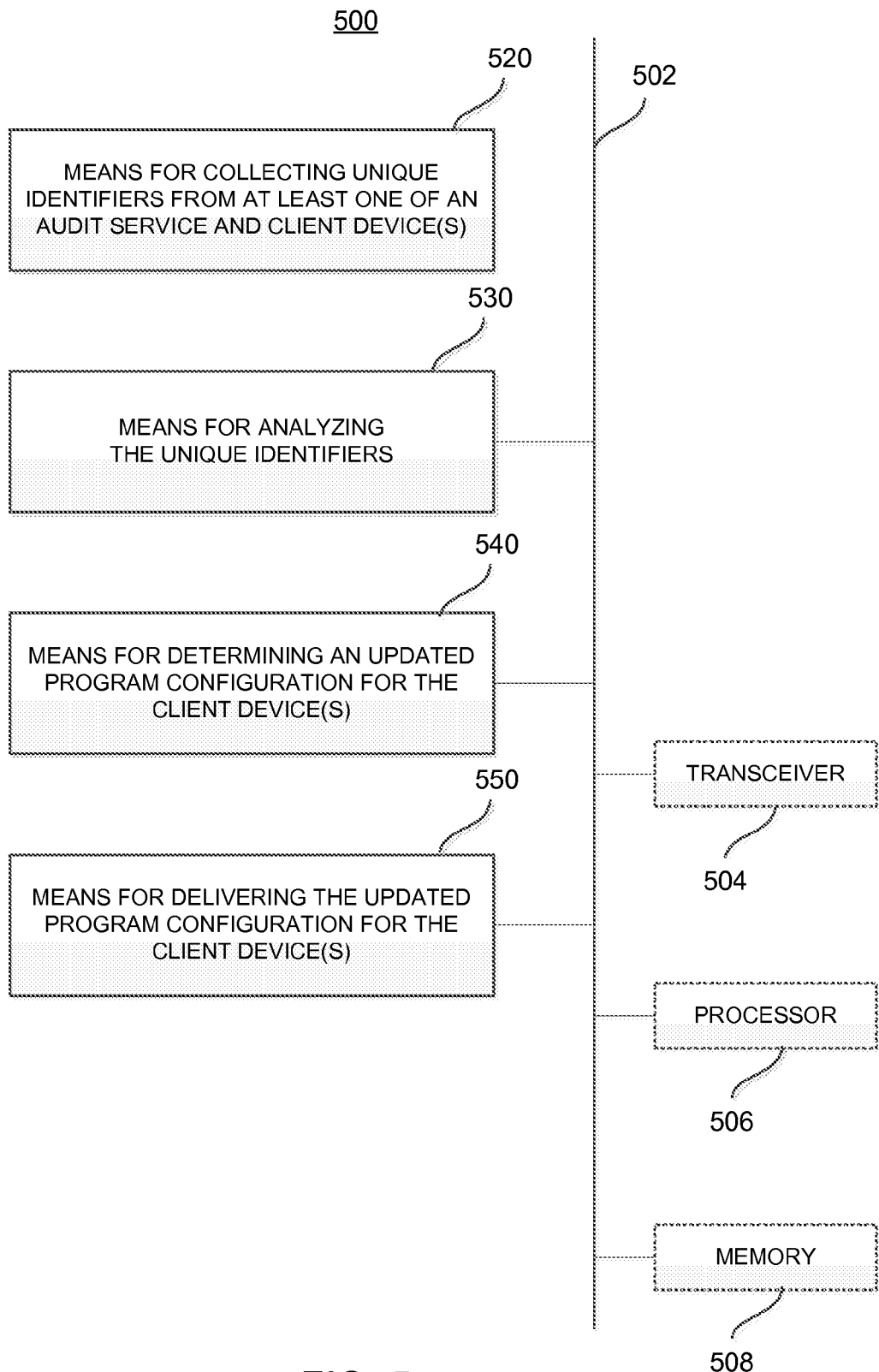
FIG. 5 is a block diagram of an apparatus according to the invention that may be configured as an update server, or as a processor or similar device for use within an update server.

FIG. 5 shows an exemplary apparatus that may be configured as either an update server, or as a processor or similar device for use within the update server. an exemplary apparatus diagram that may be configured as an update server comprising: a transceiver 504, a processor 506 and a memory 508; or as a processor 506; or as a similar device for use within an update server 120, as shown in FIG. 1, which provides the means for implementing the method, as disclosed in FIG. 4, on the update server 120, as disclosed in FIG. 1. In particular, apparatus 500 may comprise means for collecting 520 unique identifiers from at least one of an audit server and at least one client device with a computer program for performing a remote update. In addition, the apparatus 300 may comprise means for analyzing 530 the unique identifiers that are determined, at least in part, from the machine parameter. The machine parameters may comprise a combination of at least one user-configurable parameter and at least one non-user-configurable parameter of the client device. Further, the apparatus 500 may comprise a means for determining 540 an updated program configuration for the device based, at least in part, on the collected one or more machine parameters. Furthermore, apparatus 500 may comprise means for delivering the updated program configuration for the client device 100 from the update server 120, as shown in FIG. 1.

It is noted that apparatus 500 may optionally include a processor module 506 having at least one processor, in the case of apparatus 500 configured as a computing device, rather than as a processor. In related aspects, apparatus 500 may include a transceiver module 504 for communicating with means for generating a device identifier by implementing or executing at least one irreversible transformation, and components thereof. A stand alone receiver and/or stand alone transmitter may be used in lieu of or in conjunction with the transceiver 504.

In addition, apparatus 500 may optionally include a means for storing information, such as, for example, a computer readable medium or memory device/module 508. Further, the memory device/module 508 may be operatively coupled to the other components of apparatus 500 via bus 302 or the like. The computer readable medium or memory device 508 may be adapted to store computer readable instructions and data for effecting the methods of FIG. 4; and, as shown in FIG. 5, the processes and behavior of means 520-550, and components thereof; or processor 506 (in the case of apparatus 300 being configured as a computing device).

In yet further related aspects, the memory module 508 may optionally include executable code for the processor module 506 configured to: (a) collect unique identifiers from at least one of an audit server and client device; (b) analyze the collected unique identifiers; (c) determine an updated program configuration for the client device; and (d) deliver the updated program configuration to the client device(s). One or more of steps (a)-(d) may be performed by a processor module in lieu of or in conjunction with the means described above.

Figure 6:
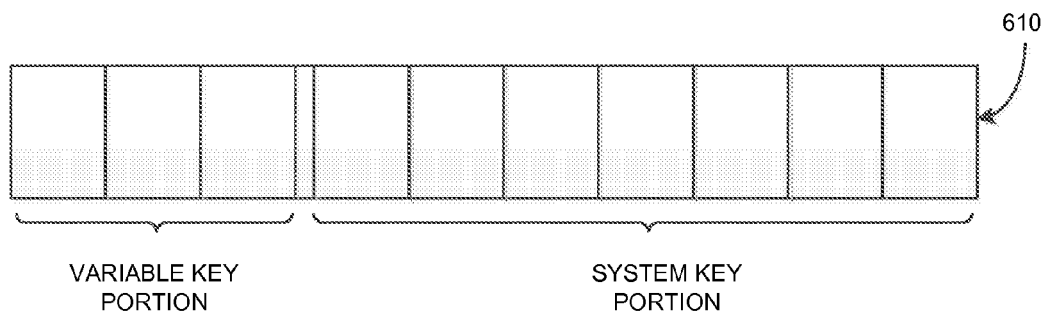
FIG. 6 is a block diagram of memory allocation for a unique device identifier used in the various exemplary embodiments of the invention.

FIG. 6, discloses, for one or more embodiments described herein, an exemplary format for a unique device identifier 600, which may further include two components: (1) a variable key portion; and (2) a system key portion. The variable key portion may be generated at the time of registration of client device 100 by reference to a variable platform parameter, such as, but not limited to: a reference to system time information, location and/or other parameters that are variable in nature may be utilized in other embodiments. The system key portion may include the above described parameters expected to be unique to the client device 100, that are for example, but not limited to: hard disk volume name, user name, computer name, user password, hard disk initialization date, or combinations thereof. The variable key portion and/or system key portion may be combined with the IP address and/or other platform parameters of the client device 100. It is noted that unique device identifiers, or portions thereof, may be encrypted to add an additional layer of specificity and security.

With respect to the system, method and apparatus of the invention, the following paragraphs provide additional detail regarding the implementation of each of the embodiments discussed above.

The machine parameters may further include, but are not limited to: user account information, program information (e.g., serial number); location of a user within a given application program, and features of the software/hardware the user is entitled to use. As shown in FIG. 1, block 107, the updated program configuration delivered to the client device may include, but is not limited to: binary, executables, paths, dlls, miss or assets.

The client device 100 may be, but is not limited to, a personal computer, a server computer, a laptop computer, a tablet computer, a personal digital assistant, a mobile phone, a wireless communication device, an onboard vehicle computer, a game console, or any other machine/device capable of communication with a computer network, such as but not limited to the Internet. In related aspects, in wireless communications, Over The Air (OTA) Push or the like may be implemented to download onto or upgrade (e.g., configuration/settings, etc.) client network devices. OTA Push involves the use of wireless phone numbers (MS-ISDN) rather than IP.

The client device 100 may comprise software (e.g., an operating system or other applications) that requires a license to be authorized for use. The client device 100 may further comprise an auditing tool or application. The auditing application may be any program or application that collects identifying information regarding the client device 100 and/or software on the client device 100. The auditing application may comprise a stand alone application or an applet running within a web browser on the client device 100 (e.g., an applet comprising executable code for a Java Virtual Machine).

The auditing application may be embedded in or associated with another software application, including, but not limited to software. For example, the auditing application may be embedded in or associated with a tool bar of a software application, for example, but not limited to a web browser. The auditing application may prompt the user to register with an online software registration service, or may run in the background with little or no interaction with the user of the client device 100.

The auditing application may include a registration routine that collects information regarding client device 100 by checking a number of parameters which are expected to be unique to the client device environment. The parameters checked may include, but are not limited to: hard disk volume name, user name, device name, user password, hard disk initialization date, etc. The collected information may include, but is not limited to: information that identifies the hardware comprising the platform on which the web browser runs, such as, CPU number, or other unique parameters associated with the firmware in use. The system information may further include, but is not limited to: system configuration information, amount of memory, type of processor, software or operating system serial number, etc.

In the alternative, or in addition, the parameters checked may include, but are not limited to virtual machine specifications. Examples of virtual machine specifications may include, but are not limited to: information relating to virtual processors, virtual BIOS, virtual memory, virtual graphics, virtual IDE drives, virtual SCSI devices, virtual PCI slots, virtual floppy drives, virtual serial (COM) ports, virtual parallel (LPT) ports, virtual keyboard, virtual mouse and drawing tablets, virtual Ethernet card, virtual networking, virtual sound adapter, etc.

Based on the collected information, the auditing application may generate a device identifier that is unique for the client device 100. In the alternative, or in addition, the auditing application may gather and send the device parameters to a remote server, such as audit server 110, which in turn generates the device identifier. The device identifier may be stored in a hidden directory of the client device 100 and/or at a remote location, such as the audit server 110. The device identifier may incorporate the device's IP address and/or other geo-location code (e.g., GPS data, cell site triangulation data, or the like, or combinations thereof) to add another layer of specificity to client device's unique identifier.

An application (e.g., auditing application) running on the client device 100 or otherwise having access to the hardware and file system of the client device 100 may generate a device identifier (e.g., a unique device identifier) using a process that operates on data indicative of the configuration and hardware of the client device 100. The device identifier may be generated using a combination of user-configurable and non-user-configurable machine parameters as input to a process that results in the device identifier, which may be expressed in digital data as a binary number.

Each machine parameter is data determined by a hardware component, software component, or data component specific to the client device 100. Machine parameters may be selected based on the target device system configuration such that the resulting device identifier has a very high probability (e.g., greater than 99.999%) of being a unique identifier of the client device 100.

In addition, the machine parameters may be selected such that the device identifier includes at least a stable unique portion up to and including the entire identifier that has a very high probability of remaining unchanged during normal operation of the client device 100. As a result, the device identifier should be highly specific, unique, reproducible and stable as a result of properly selecting the machine parameters.

The application for generating the unique device identifier may also operate on the collected parameters with one or more algorithms to generate the device identifier. This process may include at least one irreversible transformation, such as, but not limited to a cryptographic hash function. As a result, the input machine parameters cannot be derived from the resulting device identifier. Thus, each device identifier, to a very high degree of certainty, cannot be generated except by the suitably configured application operating or otherwise having had access to the same client device for which the device identifier was first generated. Conversely, each device identifier, again to a very high degree of certainty, can be successfully reproduced by the suitably configured application operating or otherwise having access to the same client device 100 on which the device identifier was first generated.

The auditing application may operate by performing a system scan to determine a present configuration of the client device. The auditing application may then select the machine parameters to be used as input for generating the unique device identifier. Selection of parameters may vary depending on the system configuration. Once the parameters are selected, the application may generate the device identifier.

Further, generating the device identifier may also be described as generating a device fingerprint and may entail the sampling of physical, non-user configurable properties as well as a variety of additional parameters such as uniquely generated hashes and time sensitive values. During a standard operating lifetime, the process of passing electricity through the various switches causes a computer chip to degrade. These degradations manifest as gradually slower speeds that extend the processing time required to compute various benchmarking algorithms. Physical device parameters available for sampling may include, but are not limited to: unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as, but not limited to: heat and additional stresses placed on a chip during the sampling process. This approach allows for each and every benchmark to reproduce the expected values.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with, but not limited to, one or more of the following: machine model; machine serial number; machine copyright; machine ROM version; machine bus speed; machine details; machine manufacturer; machine ROM release date; machine ROM size; machine UUID; and machine service tag. Further, the device identifier may also be generated by utilizing machine parameters associated with, but not limited to, one or more of the following: CPU ID; CPU model; CPU details; CPU actual speed; CPU family; CPU manufacturer; CPU voltage; and CPU external clock.

The device identifier may also be generated by utilizing machine parameters associated with, but not limited to, one or more of the following: memory model; memory slots; memory total; and memory details. Further, the device identifier may also be generated by utilizing machine parameters associated with, but not limited to, one or more of the following: video model; video details; display model; display details; audio model; and audio details.

The device identifier may also be generated by utilizing machine parameters associated with, but not limited to, one or more of the following: network model; network address; Bluetooth address; BlackBox model; BlackBox serial; BlackBox details; BlackBox damage map; BlackBox volume name; NetStore details; and NetStore volume name. Furthermore, the device identifier may also be generated by utilizing machine parameters associated with, but not limited to, one or more of the following: optical model; optical serial; optical details; keyboard model; keyboard details; mouse model; mouse details; printer details; and scanner details.

The device identifier may also be generated by utilizing machine parameters associated with, but not limited to, one or more of the following: baseboard manufacturer; baseboard product name; baseboard version; baseboard serial number; and baseboard asset tag. Moreover, the device identifier may also be generated by utilizing machine parameters associated with, but not limited to, one or more of the following: chassis manufacturer; chassis type; chassis version; and chassis serial number.

The device identifier may also be generated by utilizing machine parameters associated with, but not limited to, one or more of the following: IDE controller; SATA controller; RAID controller; and SCSI controller. Further, the device identifier may also be generated by utilizing machine parameters associated with, but not limited to, one or more of the following: port connector designator; port connector type; port connector port type; and system slot type.

The device identifier may also be generated by utilizing machine parameters associated with, but not limited to, one or more of the following: cache level; cache size; cache max size; cache SRAM type; and cache error correction type. Furthermore, the device identifier may also be generated by utilizing machine parameters associated with, but not limited to, one or more of the following: fan; PCMCIA; modem; portable battery; tape drive; USB controller; and USB hub.

The device identifier may also be generated by utilizing machine parameters associated with, but not limited to, one or more of the following: device model; device model IMEI; device model IMSI; and device model LCD. Moreover, the device identifier may also be generated by utilizing machine parameters associated with, but not limited to, one or more of the following: wireless 802.11; webcam; game controller; silicone serial; and PCI controller.

In one example, the device identifier may also be generated by utilizing machine parameters associated with, but not limited to, one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Further, with reference once again to FIG. 1 the auditing application may also include a registration routine that collects or receives information regarding the software on the client device 100 by checking information which is expected to be unique to software, for example, but not limited to the software serial number. The collected software identifier may include, but is not limited to: the software serial number, product identification number, product key, etc. The collected software identifier may include, but is not limited to: information regarding where the software was sold or distributed, who the buyers, sellers, and/or distributors were, which stores the software was sold in, etc.

The software identifier may be unique to particular copy of software, such as when the software is licensed to a single user. In the alternative, or in addition, the software identifier may be unique to particular type or group of software, such as when the software is licensed to a defined group of users.

The embodiments described herein comprise an auditing application that collects the software identifier for software on the client devices. However, it will be understood that the systems, methods and components described herein can be adapted to collect one or more types of software identifiers for a plurality of software applications. The software identifier may be stored in a hidden directory of the client device 100 and/or at a remote location, such as the audit server 110. For example, in one approach, the software identifier, device identifier, and/or combinations thereof may be hidden in multiple locations on the client device 100 and may be cross-checked for tampering, corruption, etc. In another approach, the software identifier, device identifier, and/or combinations thereof may be hidden in multiple locations, including one or more remote locations/servers, and may be crosschecked with each other to verify the integrity of the identifiers.

The auditing application may also include a registration routine that collects or receives information regarding the geo-location code of the client device 100. The geo-location code may comprise, but is not limited to: the IP address, GPS data, cell site triangulation data, or the like for the client device 100.

Auditing application may electronically send the device identifier and the software identifier to the auditing server 110 or directly to the update server 120 via the Internet 102. In the alternative, or in addition, a geo-location code may be associated with the device identifier and/or the software identifier and may be sent to the auditing server 110 or directly to the update server 120, via a secured network connection or via the Internet 102. Further, the client device 100 or the auditing server 110 may encrypt and store the data, such as the device identifier, the software identifier, and/or the geo-location code, received from the client device 100. In addition, the auditing server 110 may receive such data from a plurality of client devices and store the received data in an audit database.

In one embodiment, the auditing application may generate an audit number by associating the software identifier with the device identifier and/or geo-location code, and may send the generated audit number to the audit server 110 or store the audit number in the client device 100.

In another embodiment, the auditing application may send the device identifier, the software identifier, and/or the geo-location code to the audit server 110 in a piecemeal manner. The audit server 110 may in turn generate the audit number. The audit server 110 may receive or generate audit numbers from a plurality of client devices 110 and store the received audit numbers in the audit database.

It is noted that the audit number may be generated from the device identifier, the software identifier, and/or the geo-location code via any number of suitable approaches. For example, the software identifier may be concatenated or linked with the device identifier and/or geo-location code. It is also noted that the audit number may be stored in a hidden directory of the client device 100 and/or at a remote location, such as the audit server 110. It is further noted that the device identifier, the software identifier, and/or the geo-location code may at a later time be extracted from the audit number.

When a user of a client device, including but not limited to client device 110, installed with auditing application, attempts to run software, the auditing application in response may transmit the software identifier associated with the device identifier and/or the geo-location code (or an audit number generated from such data) to the audit server 110, which in turn may store the received data in the audit database.

With reference to the embodiment of FIG. 1, the audit server 110 may be in operative communication with an upgrade server 120, which may be any device, for example, but not limited to: personal computer, a server computer, a laptop computer, a tablet computer, a personal digital assistant, a mobile phone, or a wireless communication device, that is capable of communication with a computer network, such as the Internet. The upgrade server 120 may comprise a remote update application, which may be any program or application, such as a stand alone application or an application that is embedded or associated with another software application, such as an applet running within a web browser on the upgrade server 120.

The remote update application may be adapted to allow a user, for example, but not limited to a software manufacturer or distributor, to view the data collected and stored in the audit database of the client device 100, audit server 110 or that is collected from the client device 100. The present embodiment will be described in the context of a software manufacturer utilizing the remote update application. However, it will be understood that any user of the remote update server 120 may utilize the remote update application.

The remote update application may present the data in the audit database or that which is collected from the client device 100 in a manner that allows its user to better understand how its software is being used, legitimately or otherwise.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A system for remotely updating a program configuration, comprising a client device and an update server wherein:
   (a) the client device is configured to execute a computer program to perform a remote update of a program configuration on the client device, the client device comprising:
      a first processor coupled to a memory storing the computer program which, when executed by the first processor, (i) performs physical device recognition on the client device to determine machine parameters including account information for a user of the client device and features of software that the user of the client device is entitled to use, (ii) generates a unique device identifier for the client device, the unique device identifier is generated based at least in part on the determined machine parameters, and (iii) collects a unique software identifier for the software on the client device, the unique software identifier being unique to a particular copy of the software and to a particular user of the software; and
      a first transceiver configured to send the unique device identifier and the unique software identifier to the update server via the Internet; and
   (b) the update server is configured to receive the unique device identifier and the unique software identifier from the client device, the update server comprising:
      a second processor coupled to a memory and configured to analyze the unique device identifier and the unique software identifier at the update server, and to determine, based on the analyzed unique device identifier and the analyzed unique software identifier, an updated program configuration if the user associated with the unique device identifier is entitled to use features of the updated program configuration according to a license associated with the unique software identifier; and
      a second transceiver configured to deliver, via the Internet, data representing the updated program configuration to the client device for storage therein.

2. The system of claim 1 wherein the unique device identifier comprises a hash code.

3. The system of claim 1 wherein the computer program, when executed, implements at least one irreversible transformation such that the machine parameters cannot be derived from the unique device identifier.

4. The system of claim 3 wherein the at least one irreversible transformation comprises a cryptographic hash function.

5. The system of claim 1 wherein the unique device identifier further comprises one or more geo-location codes.

6. The system of claim 5 wherein at least one of the one or more geo-location codes comprises an Internet Protocol address of the client device.

7. The system of claim 1 wherein the machine parameters comprise information regarding at least one of: machine model number, machine serial number, machine ROM version, machine bus speed, machine manufacturer name, machine ROM release date, machine ROM size, machine UUID, and machine service tag.

8. The system of claim 1 wherein the machine parameters comprise information regarding at least one of: CPU ID, CPU model, CPU details, CPU actual speed, CPU family, CPU manufacturer name, CPU voltage, and CPU external clock.

9. The system of claim 1 wherein the machine parameters comprise information regarding at least one of: optical model, optical serial number, keyboard model, mouse model, printer model, and scanner model.

10. The system of claim 1 wherein the machine parameters comprise information regarding at least one of: baseboard manufacturer, baseboard product name, baseboard version, baseboard serial number, and baseboard asset tag.

11. The system of claim 1 wherein the machine parameters comprise information regarding at least one of: chassis manufacturer, chassis type, chassis version, and chassis serial number.

12. The system of claim 1 wherein the machine parameters comprise information regarding at least one of: IDE controller, SATA controller, RAID controller, and SCSI controller.

13. The system of claim 1 wherein the machine parameters comprise information regarding at least one of: port connector designator, port connector type, port connector port type, and system slot type.

14. The system of claim 1 wherein the machine parameters comprise information regarding at least one of: cache level, cache size, cache max size, cache SRAM type, and cache error correction type.

15. The system of claim 1 wherein the machine parameters comprise information regarding at least one of: fan, PCMCIA, modem, portable battery, tape drive, USB controller, and USB hub.

16. The system of claim 1 wherein the machine parameters comprise information regarding at least one of: device model, device model IMEI, device model IMSI, and device model LCD.

17. The system of claim 1 wherein the machine parameters comprise information regarding at least one of: wireless 802.11, webcam, game controller, silicone serial, and PCI controller.

18. A client device configured to execute a computer program to perform a remote update of a program configuration on the client device, the client device comprising:

a processor;

a memory coupled to the processor and storing the computer program which, when executed by the processor, (i) performs physical device recognition on the client device to determine machine parameters including account information for a user of the client device and features of software that the user of the client device is entitled to use, (ii) generates a unique device identifier for the client device, the unique device identifier is generated based at least in part on the determined machine parameters, and (iii) collects a unique software identifier for the software on the client device, the unique software identifier being unique to a particular copy of the software and to a particular user of the software; and a transceiver configured to (i) send the unique device identifier and the unique software identifier to an update server via the Internet to determine, based on analyzing the unique device identifier and the unique software identifier, an updated program configuration, and (ii) receive, from the update server, the updated program configuration if the user associated with the unique device identifier is entitled to use features of the updated program configuration according to a license associated with the unique software identifier.

* * * * *